United States Patent
Grosmougin et al.

(10) Patent No.: US 6,305,348 B1
(45) Date of Patent: Oct. 23, 2001

(54) METHOD FOR ENHANCED SPLIT INJECTION IN INTERNAL COMBUSTION ENGINES

(75) Inventors: Anne-Lise Grosmougin, Birmingham; Richard M. Avery, Jr., West Bloomfield, both of MI (US)

(73) Assignee: Detroit Diesel Corporation, Detroit, MI (US)

( * ) Notice: Subject to any disclaimer, the term of this patent is extended or adjusted under 35 U.S.C. 154(b) by 0 days.

(21) Appl. No.: 09/629,836

(22) Filed: Jul. 31, 2000

(51) Int. Cl.[7] .................................................. F02M 37/04
(52) U.S. Cl. ........................................ 123/299; 123/300
(58) Field of Search .................................. 123/299, 300, 123/295

(56) References Cited

U.S. PATENT DOCUMENTS

| | | |
|---|---|---|
| 4,223,654 | 9/1980 | Wessel et al. . |
| 4,368,702 | 1/1983 | Finsterwalder et al. . |
| 5,131,371 | 7/1992 | Wahl et al. . |
| 5,165,373 | 11/1992 | Cheng . |
| 5,165,579 | 11/1992 | Lund . |
| 5,231,962 | 8/1993 | Osuka et al. . |
| 5,313,924 | 5/1994 | Regueiro . |
| 5,357,926 | 10/1994 | Hu . |
| 5,402,760 | 4/1995 | Takeuchi et al. . |
| 5,445,128 | 8/1995 | Letang et al. . |
| 5,477,827 | 12/1995 | Weisman, II et al. . |
| 5,482,017 | 1/1996 | Brehob et al. . |
| 5,483,927 | 1/1996 | Letang et al. . |
| 5,494,219 | 2/1996 | Maley et al. . |
| 5,568,799 | 10/1996 | Akazaki et al. . |
| 5,629,853 | 5/1997 | Ogawa et al. . |
| 5,647,317 | 7/1997 | Weisman, II et al. . |
| 5,732,676 | 3/1998 | Weisman et al. . |
| 5,771,865 | 6/1998 | Ishida . |
| 5,890,467 | 4/1999 | Romzek . |
| 5,924,403 | * 7/1999 | Thomas ................................ 123/300 |
| 6,032,642 | 3/2000 | Trumbower et al. . |
| 6,164,264 | * 12/2000 | Thomas ................................ 123/300 |

\* cited by examiner

Primary Examiner—Bibhu Mohanty
(74) Attorney, Agent, or Firm—Brooks & Kushman P.C.

(57) ABSTRACT

A method of controlling fuel delivery in an internal combustion engine includes enabling split injection status without subjection to a temperature comparison while the engine operates in the start mode, and enabling split injection status without subjection to a time limit while the engine operates in the idle normal mode, but with subjection to the temperature comparison in the idle normal mode. In the method, a temperature threshold is established, an engine operating temperature is monitored, the engine operating temperature is compared to the temperature threshold. Further, the engine is operated in the start mode, and at that time, the split injection status is enabled without subjection to the temperature comparison. Thereafter, the engine is operated in the idle normal mode, and at that time, the split injection status is enabled without subjection to a time limit while the engine operates in the idle normal mode and the engine operating temperature falls below the temperature threshold to enhance cold temperature operation. Otherwise, when the operating temperature exceeds the temperature threshold during idle normal mode, the split injection status is disabled.

9 Claims, 9 Drawing Sheets

METHOD FOR ENHANCED SPLIT INJECTION IN INTERNAL COMBUSTION ENGINES

TECHNICAL FIELD

The present invention relates to a method for controlling a compression-ignition internal combustion engine.

BACKGROUND ART

In the control of fuel injection systems, the conventional practice utilizes electronic control units having volatile and non-volatile memory, input and output driver circuitry, and a processor capable of executing a stored instruction set, to control the various functions of the engine and its associated systems. A particular electronic control unit communicates with numerous sensors, actuators, and other electronic control units necessary to control various functions, which may include various aspects of fuel delivery, transmission control, or many others.

Fuel injectors utilizing electronic control valves for controlling fuel injection have become widespread. This is due to the precise control over the injection event provided by electronic control valves. In operation, the electronic control unit determines an energizing or excitation time for the control valve corresponding to current engine conditions. The excitation of the control valve causes a cascade of hydraulic events leading to the lifting of the spray tip needle, which causes fuel injection to occur.

Several attempts have been made to enhance fuel injection capabilities. One such method is known as split injection. Split injection consists of a first injection, called the pilot injection, followed by a delay, and then a second injection, referred to as the main injection. When performing split injection, precise control over pulse quantities, timing, and separation is essential. Many times, operating conditions at which split injection may be performed are restricted to lower engine speeds due to difficulties in achieving precise control over the injection process.

DISCLOSURE OF INVENTION

It is therefore an object of the present invention to provide a method for enhanced split injection that enhances cold temperature engine operation.

In carrying out the above object and other objects and features of the present invention, a method of controlling fuel delivery in an internal combustion engine is provided. The engine is operable in a plurality of operating modes including a start mode and a normal mode. The normal mode includes an idle normal mode and a non-idle normal mode. The engine has a split injection status, which may be set as enabled or disabled. The engine has a fuel injection system configured to perform a split injection wherein a pilot injection event is separated from a main injection event by a delay when the split injection status is enabled. The fuel injection system is configured to perform a single injection when the split injection status is disabled. The method comprises establishing a temperature threshold, monitoring an engine operating temperature, and comparing the engine operating temperature to the temperature threshold. The method further comprises operating the engine in the start mode, and enabling the split injection status without subjection to the temperature comparison while the engine operates in the start mode. The method further comprises, after operating the engine in the start mode, operating the engine in the idle normal mode, and enabling the split injection status without subjection to a time limit while the engine operates in the idle normal mode and the engine operating temperature falls below the temperature threshold to enhance cold temperature engine operation. Otherwise, the split injection status is disabled while the engine operates in the idle normal mode.

In one embodiment, the method further comprises operating the engine in the non-idle normal mode, and disabling the split injection status while the engine operates in the non-idle normal mode. Alternatively, the method further comprises operating the engine in the non-idle normal mode, and enabling the split injection status without subjection to a time limit while the engine operates in the non-idle normal mode and the engine operating temperature falls below the temperature threshold to enhance cold temperature engine operation. Otherwise, the split injection status is disabled while the engine operates in the non-idle normal mode.

Further, in carrying out the invention, an engine controller is provided. The engine controller includes a computer readable storage medium having instructions thereon that are executable by the engine controller to perform a method of controlling fuel delivery in an internal combustion engine. The medium further comprises instructions for establishing a temperature threshold, instructions for monitoring an engine operating temperature, instructions for comparing the engine operating temperature to the temperature threshold, and instructions for operating the engine in the start mode. The medium further comprises instructions for enabling the split injection status without subjection to the temperature comparison while the engine operates in the start mode. Further, the medium comprises instruction for after operating the engine in the start mode, operating the engine in the idle normal mode. Further, the medium comprises instructions for enabling the split injection status without subjection to a time limit while the engine operates in the idle normal mode and the engine operating temperature falls below the temperature threshold to enhance cold temperature engine operation. Otherwise, the split injection status is disabled while the engine operates in the idle normal mode.

In some embodiments, the medium further comprises instructions for operating the engine in the non-idle normal mode. In the non-idle normal mode, the split injection status may be disabled, or enabled. When the split injection status is enabled, the status is enabled without subjection to a time limit while the engine operates in the non-idle normal mode and the engine operating temperature falls below the temperature threshold to enhance cold temperature engine operation.

Still further, in carrying out the present invention, an internal combustion engine is provided. The internal combustion engine comprises an engine block with a plurality of cylinders, a plurality of fuel injectors disposed at the cylinders, and an engine controller including a computer readable storage medium having instructions thereon that are executable by the engine controller to perform a method of controlling fuel delivery in the internal combustion engine. The medium has instructions for establishing a temperature threshold, instructions for monitoring an engine operating temperature, instructions for comparing the engine operating temperature to the temperature threshold, and instructions for operating the engine in the start mode. The medium further has instructions for enabling the split injection status without subjection to the temperature comparison while the engine operates in the start mode. The medium further has instructions for after operating the engine in the start mode, operating the engine in idle normal mode. The medium further has instructions for enabling the split injection status without subjection to a time limit while the engine operates in the idle normal mode and the engine operating temperature falls below the temperature threshold to enhance cold temperature engine operation. Otherwise, the split injection status is disabled while the engine operates in the idle normal mode.

Further, in some embodiments, the medium further has instructions for operating the engine in the non-idle normal mode. In the non-idle normal mode, the split injection status may be disabled, or enabled without subjection to a time limit while the engine operates in the non-idle normal mode and the engine operating temperature falls below the temperature threshold to enhance cold temperature engine operation.

The advantages accruing to the present invention are numerous. For example, methods of the present invention provide delivery of single or multiple fuel injection pulses per cylinder firing with precision of pulse quantities, separation, and timing adequate for enhancing cold temperature engine operation.

The above object and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
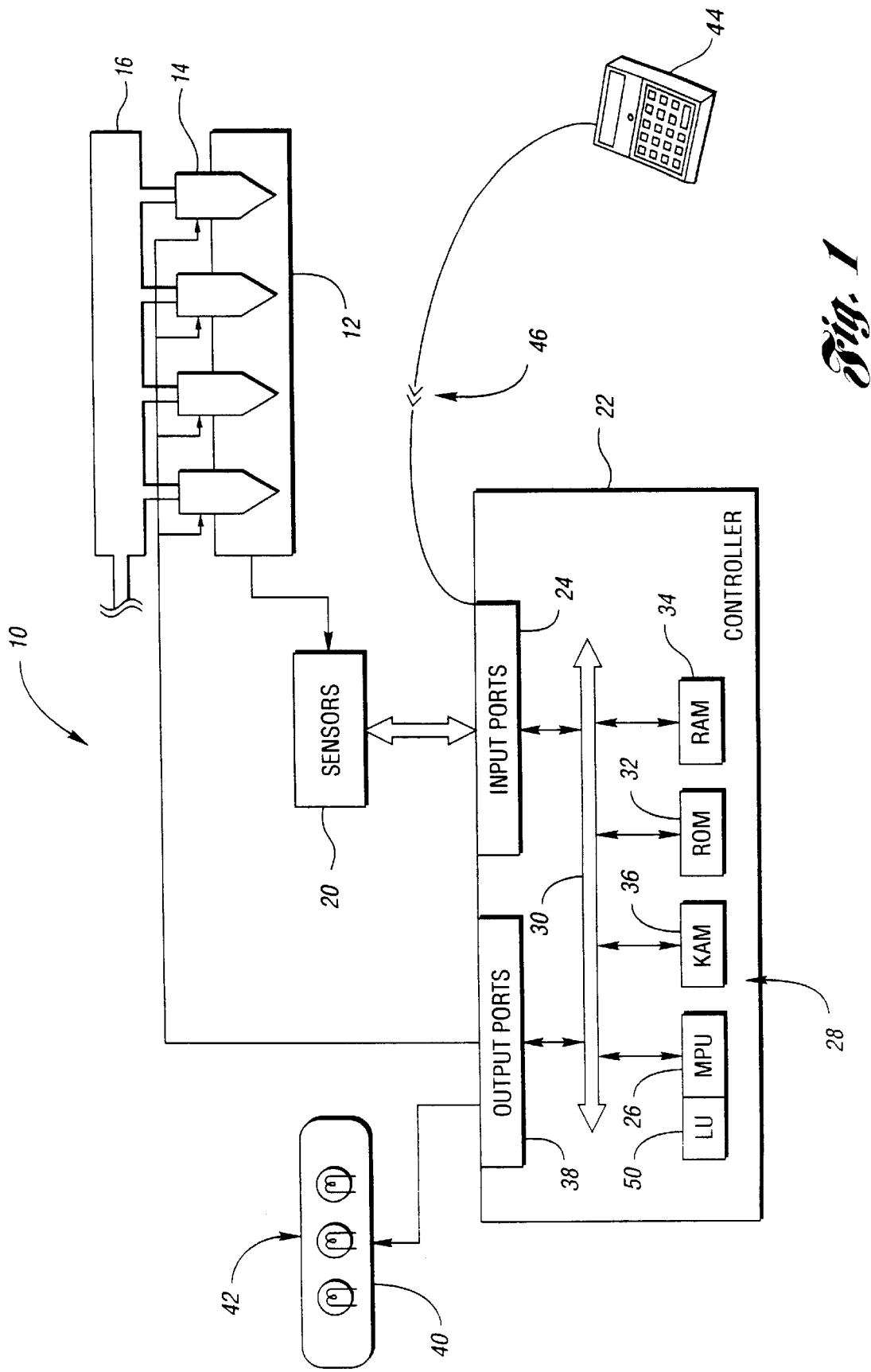
FIG. 1 is a schematic diagram of a fuel injection system made in accordance with the present invention.

Referring now to FIG. 1, a system for enhanced split injection in internal combustion engines is shown. The system, generally indicated by reference numeral 10, includes an engine 12 having a plurality of cylinders, each fed by fuel injectors 14. In a preferred embodiment, engine 12 is a compression-ignition internal combustion engine, such as a four, six, eight, twelve, sixteen or twenty-four-cylinder diesel engine, or a diesel engine having any other desired number of cylinders. The fuel injectors 14 are shown receiving pressurized fuel from a supply 16 which is connected to one or more high or low pressure pumps (not shown) as is well known in the art. Alternatively, embodiments of the present invention may employ a plurality of unit pumps (not shown), each pump supplying fuel to one of the injectors 14.

The system 10 may also include various sensors 20 for generating signals indicative of corresponding operational conditions or parameters of engine 12, the vehicle transmission (not shown), and other vehicular components. Sensors 20 are in electrical communication with a controller 22 via input ports 24. Controller 22 preferably includes a microprocessor 26 in communication with various computer readable storage media 28 via data and control bus 30. Computer readable storage media 28 may include any of a number of known devices which function as a read-only memory (ROM) 32, random access memory (RAM) 34, keep-alive memory (KAM) 36 such as non-volatile RAM, and the like. The computer readable storage media may be implemented by any of a number of known physical devices capable of storing data representing instructions executable via a computer such as controller 22. Known devices may include, but are not limited to, PROM, EPROM, EEPROM, flash memory, and the like in addition to magnetic, optical, and combination media capable of temporary or permanent data storage.

Computer readable storage media 28 include various program instructions, software, and control logic to effect control of various systems and subsystems of the vehicle, such as engine 12, vehicle transmission, and the like. Controller 22 receives signals from sensors 20 via input ports 24 and generates output signals which may be provided to various actuators and/or components via output ports 38. Signals may also be provided to a display device 40 which includes various indicators such as lights 42 to communicate information relative to system operation to the operator of the vehicle.

A data, diagnostics, and programming interface 44 may also be selectively connected to controller 22 via a plug 46 to exchange various information therebetween. Interface 44 may be used to change values within the computer readable storage media 28, such as configuration settings, calibration variables including adjustment factor look-up tables, control logic, temperature thresholds for enabling or disabling split injection, and the like.

In operation, controller 22 receives signals from sensors 20 and executes control logic embedded in hardware and/or software to allow smooth transitions between split injection and single injection, without significantly disturbing the primary engine governor. In a preferred embodiment, controller 22 is the DDEC controller available from Detroit Diesel Corporation, Detroit, Mich.

With continuing reference to FIG. 1, a logic controller, such as logic unit 50, controls the signals sent to the fuel injectors 14. Logic unit 50 determines rise-time adjustment factors, pulse width adjustment factors, pilot valve actuation detection delay adjustment factors, injection delay adjustment factors, and other injection parameters. The adjustment factors and injection parameters are determined from various engine operating conditions including but not limited to engine RPM, desired engine torque, available battery voltage, desired pilot to main inter-pulse gap, fuel temperature, measured fuel rail pressure (in common rail systems), and desired fuel rail pressure (in common rail systems).

Further, logic unit 50 determines the type of injection required: split or single, both of which may be smoothly switched between in accordance with systems and methods of the present invention, as will be described. Logic unit 50 may be included in the functions of microprocessor 26, or may be implemented in any other manner known in the art of hardware and software control systems. It will be appreciated that logic unit 50 may be a part of controller 22, or may be an independent control unit which is in communication with controller 22. It is to be appreciated that the detailed description of a split injection control strategy included herein is exemplary, and that the present invention may be achieved with other split injection control strategies. Specifically, the present invention comprehends enabling and disabling split injection in an idle normal mode of engine operation, and the split injection itself may be controlled in other ways than the exemplary way described in detail below.

As will be appreciated by one of ordinary skill in the art, the control logic may be implemented or effected in hardware, software, or a combination of hardware and software. The various functions are preferably effected by a programmed microprocessor, such as the DDEC controller, but may include one or more functions implemented by dedicated electric, electronic, or integrated circuits. As will also be appreciated, the control logic may be implemented using any one of a number of known programming and processing techniques or strategies and is not limited to the order or sequence illustrated here for convenience. For example, interrupt or event driven processing is typically employed in real-time control applications, such as control of a vehicle engine or transmission. Likewise, parallel processing or multi-tasking systems and methods may be used to accomplish the objects, features, and advantages of the present invention. The present invention is independent of the particular programming language, operating system, or processor used to implement the control logic illustrated.

Figure 2:
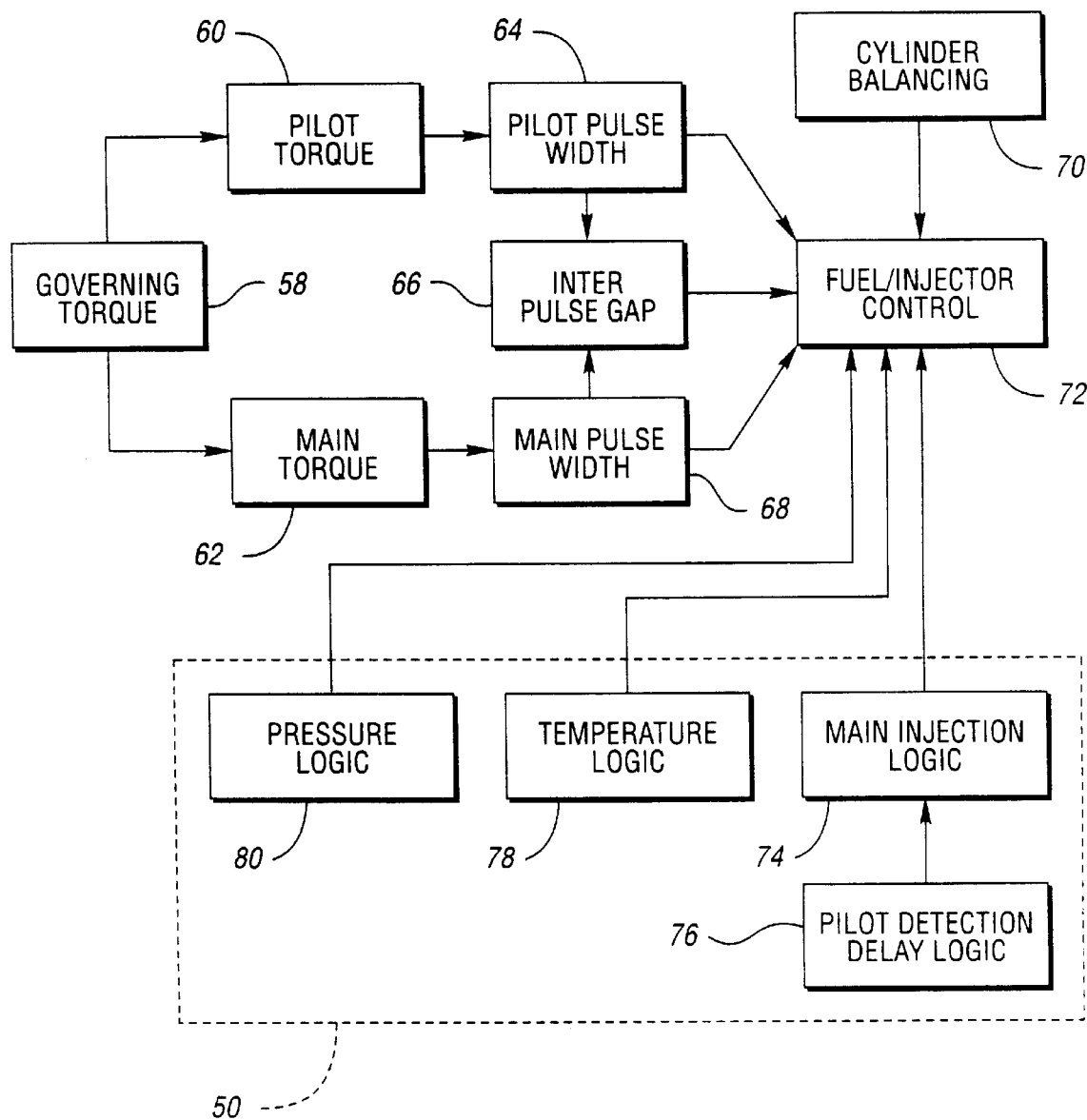
FIG. 2 is a functional block diagram illustrating fuel delivery control in accordance with the present invention.

Referring to FIG. 2, a functional block diagram illustrating enhanced split injection control is illustrated. Split injection, which is the delivering of fuel in two discrete quantities can reduce noise by reducing or eliminating ignition delay. A desired Engine Governing Torque 58 is determined based on various operating conditions such as engine RPM, throttle position, and transmission gear ratio. Alternatively, fuel per cycle or percent load could be used for the purposes of system control instead of Engine Governing Torque 58. Local Torque or Final Torque 58 is divided into a Pilot Torque (PTQ) 60 and a Main Torque (MTQ) 62. The value of PTQ 60 is the lesser of the Engine Governing Torque 58 and a Pilot Torque Limiting Value, not shown. The value of MTQ 62 is simply PTQ 60 subtracted from the Engine Governing Torque 58. If split injection is disabled, then PTQ 60 equals Engine Governing Torque 58, and MTQ 62 equals zero. In one embodiment, PTQ 60 is based on engine RPM, while MTQ 62 and Final Torque 58 are based on engine RPM and desired torque, leaving MTQ 62 equal to PTQ 60 subtracted from Engine Governing Torque 58. PTQ 60, MTQ 62, and Final Torque 58 are preferably located in look-up tables.

The quantity of fuel to be delivered is represented by the amount of angular displacement of the crankshaft, preferably measured in degrees, during which a control solenoid of an appropriate injector 14 (FIG. 1) is energized. This signal is referred to as the fuel pulse width. Alternatively, fuel quantity may be represented by a duration of pulse indexed by injection pressure. Two such Pulse Width values are determined, subject to further adjustment by other functions such as Cylinder Balancing 70 and/or other calibration techniques including injector variability compensation. The values of the pulse widths are found in a look-up table referenced by engine operating parameters, such as engine RPM and desired torque. In a preferred embodiment, the desired torque used for this look-up function will be either Engine Governing Torque 58 or MTQ 62, and PTQ 60 such that two values are obtained.

A Pilot Pulse Width (PPW) 64 corresponds to the value of PTQ 60, while a Main Pulse Width (MPW) 68 corresponds to the value of MTQ 62 or Engine Governing Torque 58 depending on the system implementation. PPW 64 and MPW 68 may be subsequently subjected to further pulse width adjustment such as SPLIT_MAIN_PW_CORR, in accordance with the present invention.

Fuel injector control 72 initiates and terminates the pilot and main injections, and communicates with logic unit 50 to control fuel injection. The main injection logic 74, pilot detection delay logic 76, temperature influence adjustment logic 78, and pressure influence adjustment logic 80 may be applied to PPW 64 and MPW 68. Further, logic unit 50 cooperates with fuel injector control 72 to precisely control fuel injection timing, as will now be described in detail.

Figure 3:
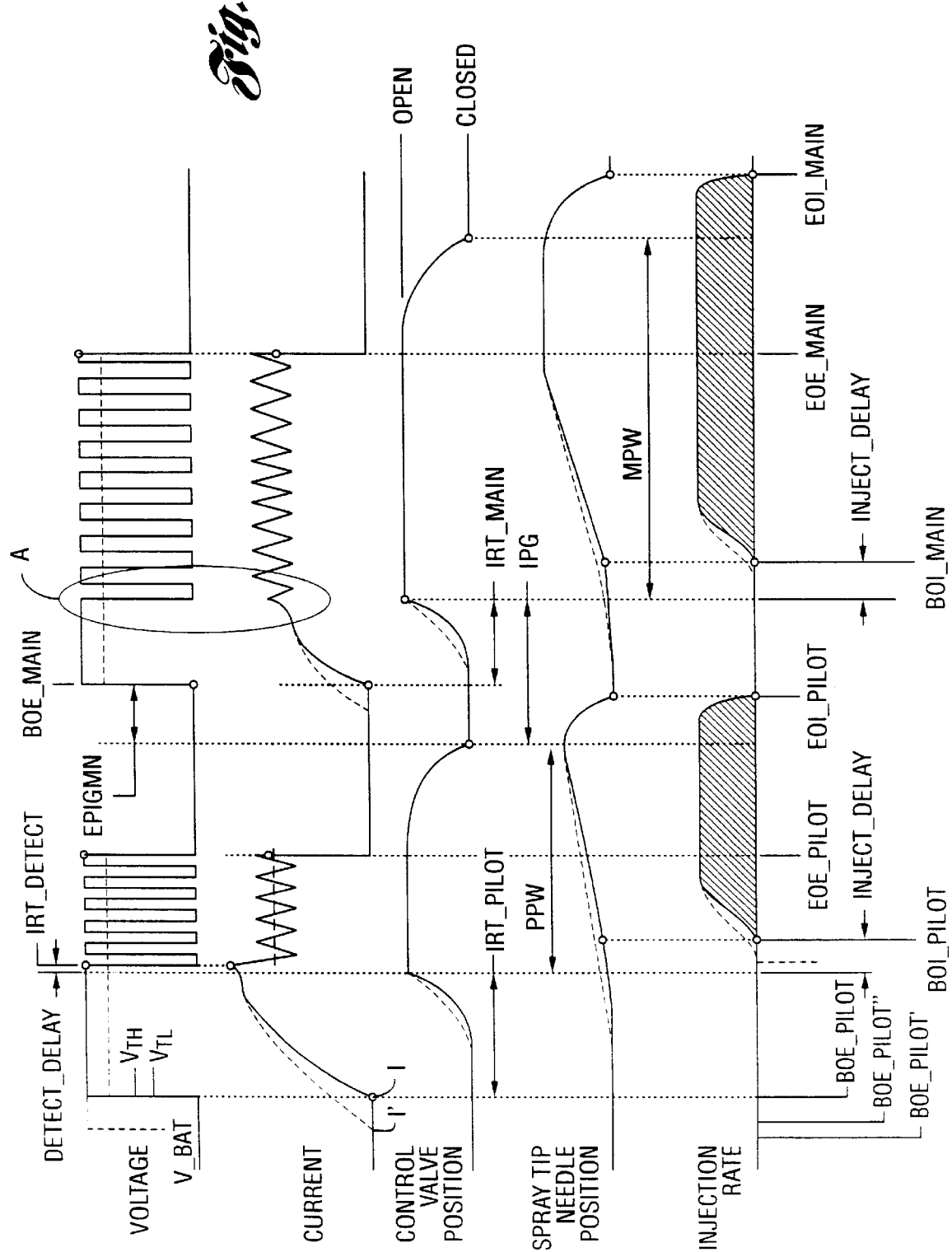
FIG. 3 is a timing diagram illustrating fuel delivery control in accordance with the present invention.
Figure 4:
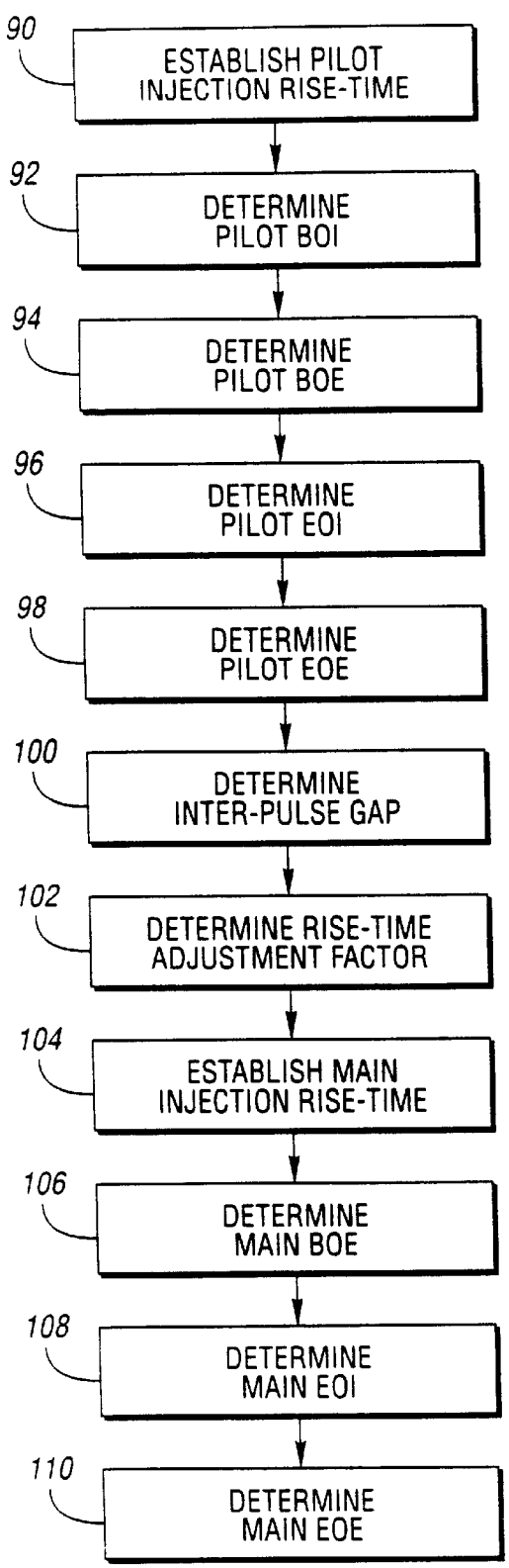
FIG. 4 is a block diagram illustrating a method of the present invention for controlling fuel delivery.

Of course, it is appreciated that in its broad aspect, the present invention comprehends temperature based control over split injection, independent of the split injection implementation and the split injection implementation described herein is exemplary. Further, the split injection implementation described herein is precise enough to allow split injection over a wide range of engine speeds. However, some embodiments of the invention only perform split injection at start up and at idle. Referring now to FIGS. 3 and 4, a fuel injection timing diagram including actuation voltage, solenoid current, control valve position, spray tip needle position and injection rate, and a method for controlling fuel delivery are illustrated. When voltage is applied to the solenoid at the beginning of either the pilot or main pulse, the control valve response includes a rise-time or actuation latency defined as the time duration from voltage application to the control valve reaching the fully actuated position. Further, it is to be understood that the term available battery voltage herein means the voltage that is available to the particular engine component such as an injector solenoid, and that different components may have different voltage levels available for use.

At step 90, a pilot injection rise-time IRT_PILOT is established. This value may be established in a variety of different ways. In a preferred embodiment, a filtered injection rise-time is determined based on previous measured rise-times for the control valve during pilot injection. IRT_PILOT may also be established via a static look-up table, or may be measured in real-time if desired. Typical values for IRT_PILOT range from about 550 microseconds to about 4500 microseconds, and may be contained in a static look-up table indexed by available battery voltage. At step 92, a pilot beginning of injection time BOI_PILOT is determined based on engine conditions such as engine RPM. When operating in split injection mode, BOI_PILOT (split mode) is offset from the BOI_PILOT (single mode) to provide adequate time for the pilot injection, inter-pulse gap, and main injections prior to piston top-dead-center to be completed at essentially the same piston position as with single injection.

At step 94, pilot beginning of excitation time BOE_PILOT is determined. BOE_PILOT precedes BOI_PILOT by at least the value of IRT_PILOT, as best shown in FIG. 3. At step 96, pilot end of injection time EOI_PILOT is determined based on BOI_PILOT and desired pilot pulse width PPW 64. PPW 64 is based on a desired pilot fuel quantity for pilot injection. At step 98, pilot end of excitation time EOE_PILOT is determined based on the required closing time of the control valve which is approximated as a constant.

At step 100, a desired inter-pulse gap IPG 66 is determined. The inter-pulse gap is the crankshaft angle or time interval beginning when the control valve reaches the fully unactuated position which terminates pilot injection, and ending when the control valve reaches the fully actuated position at the onset of main injection. IPG 66 is a function of engine RPM and is preferably not less than IRT_PILOT. IPG 66 may also be based in part on engine torque. In preferred embodiments of the present invention, IPG 66 is subjected to a minimum time duration to allow split injection over a wide range of engine RPM. IPG 66 approaches a near constant crankshaft angle as engine RPM decreases, and approaches the minimum time duration as engine RPM increases. The varying of the inter-pulse gap as described immediately above allows split injection over an RPM range of, for example, 0 to about 2400 RPM while varying IPG 66 between about four and about sixteen degrees of crankshaft angle. In a preferred embodiment, IPG values populate a look-up table indexed by RPM. It is to be appreciated that embodiments of the present invention allow split injection at near any engine speed including engine speeds of over 2000 RPM by selecting IRT_MAIN from a plurality of varying values based on engine conditions.

Main injection rise-time IRT_MAIN is determined based on IRT_PILOT, and is preferably adjusted based on inter-pulse gap. Further in a preferred embodiment, IRT_MAIN is adjusted based on measured available battery voltage V_BAT. Alternatively, IRT_MAIN may be established in any of the ways described for establishing IRT_PILOT.

Figure 7:
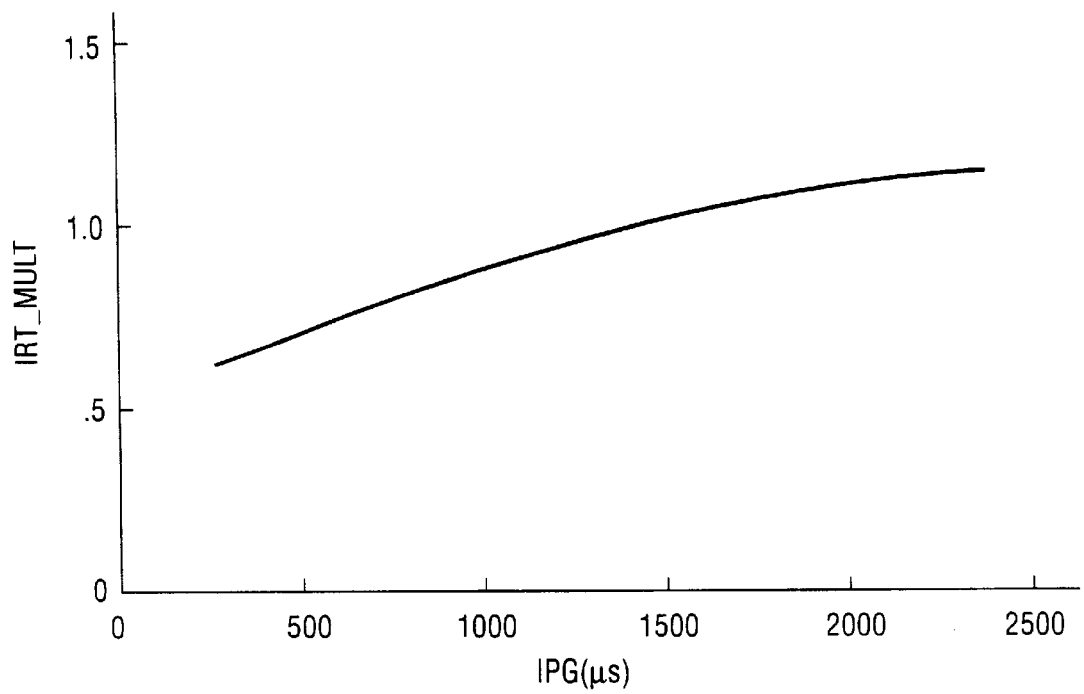
FIG. 7 is a graph depicting a split main injection rise-time adjustment factor versus inter-pulse gap which compensates for the effect of gradually diminishing solenoid magnetism on main rise-time.
Figure 8:
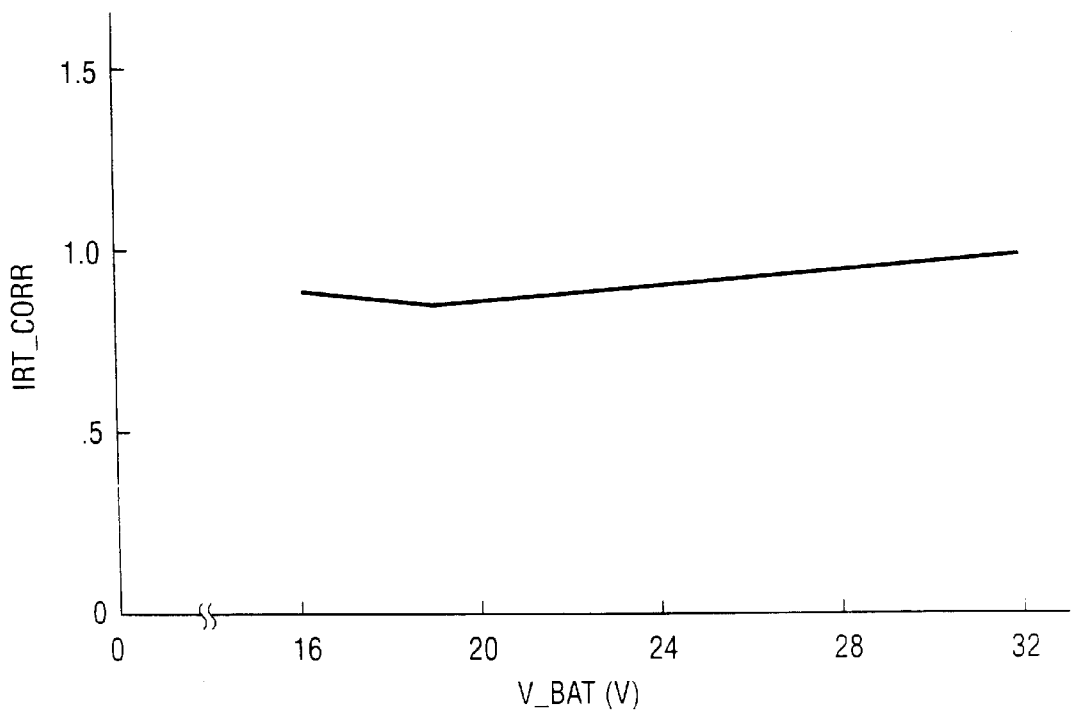
FIG. 8 is a graph depicting another main injection rise-time adjustment factor versus available battery voltage for injectors in which the opening of the control valve initiates injection.

At step 102, rise-time adjustment factors are determined for IRT_MAIN. As best shown in FIG. 7, IRT_MULT is found in a look-up table indexed by IPG. As best shown in FIG. 8, IRT_CORR is found in a look-up table indexed by V_BAT. In a preferred embodiment, at step 104, IRT_MAIN is determined according to the following equation:

$$\text{IRT\_MAIN} = \text{IRT\_PILOT} * \text{IRT\_MULT} * \text{IRT\_CORR}$$

wherein IRT_PILOT is the filtered pilot injection rise-time, and IRT_MULT and IRT_CORR are the main rise-time adjustment factors determined from look-up tables.

In one embodiment, IRT_MULT ranges from about 0.5 to about 1.16 in a look-up table indexed by engine RPM ranging from 0 to about 2400 RPM.

With continuing reference to FIGS. 3 and 4, at step 106, main beginning of excitation time BOE_MAIN is determined as IRT_MAIN subtracted from the end of the inter-pulse gap IPG 66. It has been found that after the control valve reaches the closed position, the control valve retains some magnetism. This causes faster reaction of the control valve to the main injection excitation than to pilot injection excitation. The reaction time of the control valve, as affected by retained magnetism, decreases as the inter-pulse gap decreases. To make sure that the control valve reaches the fully unactuated position and has time for valve bounce to settle prior to main excitation, BOE_MAIN is subject to a minimum time according to the following equation:

$$\text{BOE\_MAIN} = \max(t_{CLOSED} + \text{EPIGMN}, t_{CLOSED} + \text{IPG} - \text{IRT\_MAIN})$$

wherein max( ) is a function which returns the greater of the parenthetical values, $t_{CLOSED}$ is the time at which the control valve fell to its at rest or unactuated position, EPIGMN is a minimum gap time of preferably at least about 50 microseconds, IPG is the desired inter-pulse gap, and IRT_MAIN is the determined main injection rise-time. The first parenthetical value above represents a minimum excitation time for the control valve; the second parenthetical value represents a desired excitation time for the control valve.

The presence of residual magnetism at the onset of main pulse energizing reduces the latency from BOE_MAIN to the beginning of main pulse control valve opening. As battery voltage varies, the effect on IRT_MAIN differs from that on IRT_PILOT. While IRT_MAIN is primarily approximated from the IRT_PILOT and the IRT_MULT as a function of IPG 66, as shown by FIG. 7, further compensation for the influence of battery voltage on the energizing of the main pulse is provided by IRT_CORR as a function of battery voltage (FIG. 8).

At step 108, a main end of injection time EOI_MAIN is determined based on BOI_MAIN and desired main pulse width MPW 68. MPW 68 is based on a desired main fuel quantity based on engine conditions. At step 110, pilot end of excitation time EOE_PILOT is determined based on the required closing time of the control valve which is approximated as a constant.

With continuing reference to FIG. 3, in one embodiment of the present invention, split injection is enabled based on the value of V_BAT according to a hysteresis comparator. The comparator has upper and lower threshold voltages $V_{TH}$ and $V_{TL}$ respectively, which for example are equal to 20 V and 19.2 V, respectively. The lower threshold is a voltage sufficient to allow split injection below which split injection becomes disabled either for reasons based on the control system hardware, or because the rise-time values are unreasonably large. The upper threshold is that above which disabled split injection is again permitted, which prevents rapid toggling in and out of split injection mode.

It is to be understood that there may be any number of other conditions that must be met in order to allow split injection. One example is that the Engine Governing Torque 58 is between predetermined minimum and maximum torque values. It is to be appreciated that the present invention allows split injection at a wide range of engine speeds and loads, and that individual conditions that may enable or disable split injection are for further enhancement of engine performance. Further, the present invention comprehends enabling and disabling split injection at engine idle based on temperature, regardless of the split injection implementation, although the split injection implementation described herein is a suitable one.

Figure 5:
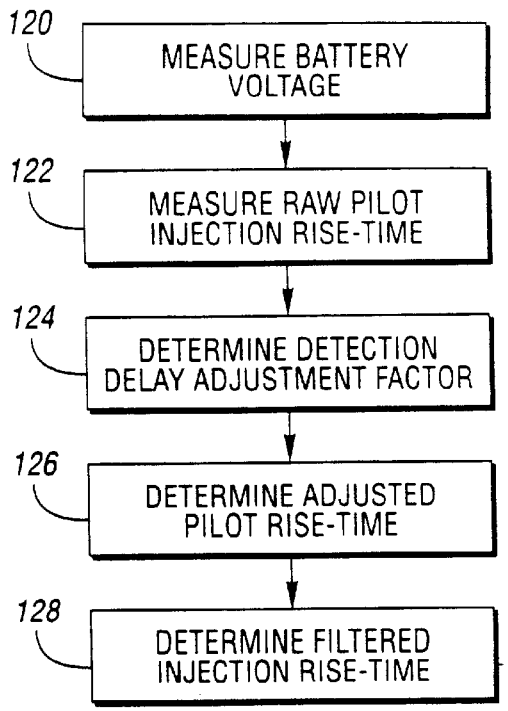
FIG. 5 is a block diagram illustrating a method of the present invention for determining filtered injector rise-time.
Figure 9:
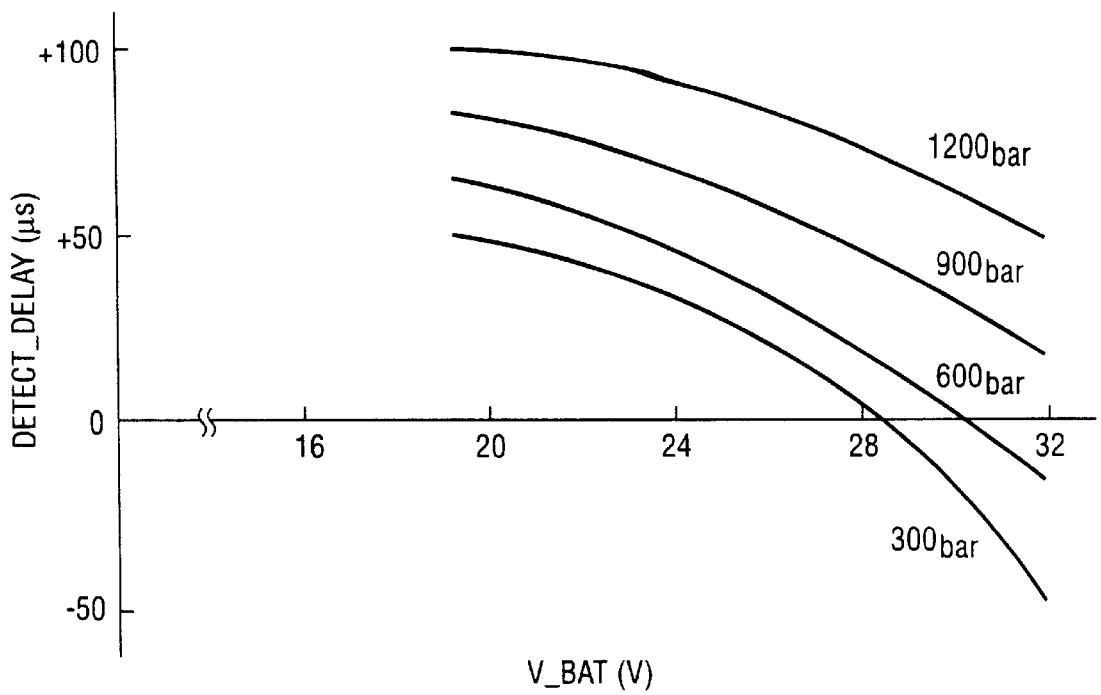
FIG. 9 is a graph depicting a valve actuation detection adjustment factor versus available battery voltage, and optionally injection pressure.

Referring now to FIGS. 3 and 5, a method of the present invention for determining filtered injection rise-time will be described. At step 120, available battery voltage V_BAT is measured. At step 122, raw pilot injection rise-time RAW_IRT_PILOT is measured by detecting the pilot injection opening of the control valve in response to pilot excitation at time IRT_DETECT. By detecting when the control valve is at the fully actuated position which is indicated by the current inflection or change in impedance (FIG. 3), control valve rise-time or actuation latency is measured. At step 124, as best shown in FIG. 9, a pilot valve opening detection delay adjustment factor DETECT_DELAY is determined. Pressure contour lines are shown to illustrate the varying of DETECT_DELAY with differing common rail injection pressures. In a fuel injection system that uses unit pumps rather than common rail 16, DETECT_DELAY may be based on V_BAT and/or fuel supply pressure and engine RPM. At step 126, an adjusted pilot rise-time IRT_PILOT is determined by subtracting DETECT_DELAY from RAW_IRT_PILOT. At step 128, filtered injection rise time is determined. The filter ideally rejects erroneous IRT_PILOT values and reduces shot-to-shot variation.

In one embodiment, DETECT_DELAY ranges from about −30 microseconds to about 65 microseconds and is indexed by pressures ranging from 0 to about 2200 Bar, and battery voltages from 0 to about 51 Volts.

Figure 6:
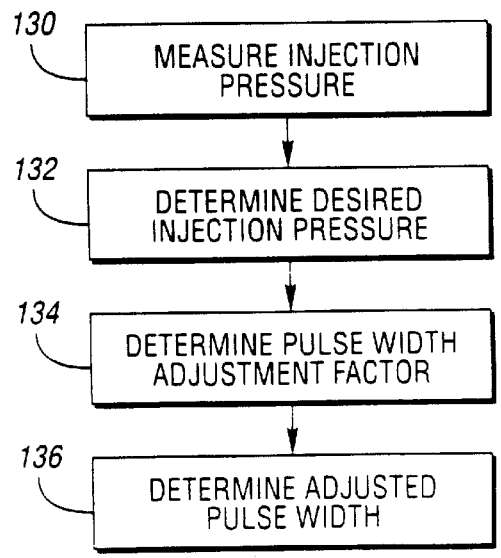
FIG. 6 is a block diagram illustrating a method of the present invention for pulse width duration adjustment to provide correct injected quantity while there exists deviation between intended and actual injection pressure.
Figure 10:
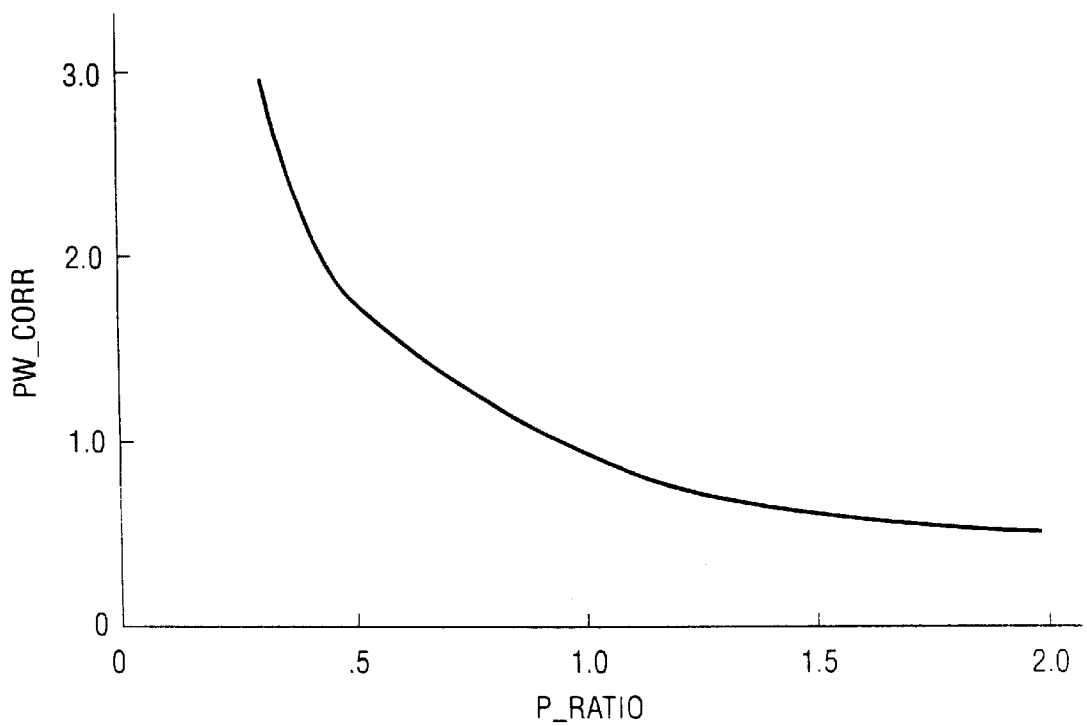
FIG. 10 is a graph depicting a pulse width adjustment factor versus an injection pressure ratio of observed pressure to desired pressure.

Referring to FIGS. 3 and 6, a method of the present invention for determining adjusted pulse width in a common rail embodiment of the present invention will now be described. At step 130, actual rail pressure for fuel injection is measured. At step 132, a desired rail pressure for fuel injection is determined based on engine RPM and desired engine torque. At step 134, as best shown in FIG. 10, an adjustment factor PW_CORR is determined from a look-up table indexed by P_RATIO. P_RATIO is the ratio of measured rail pressure to desired rail pressure. PPW 64 and MPW 68 are adjusted by multiplying the unadjusted or raw pulse width value by PW_CORR.

Figure 11:
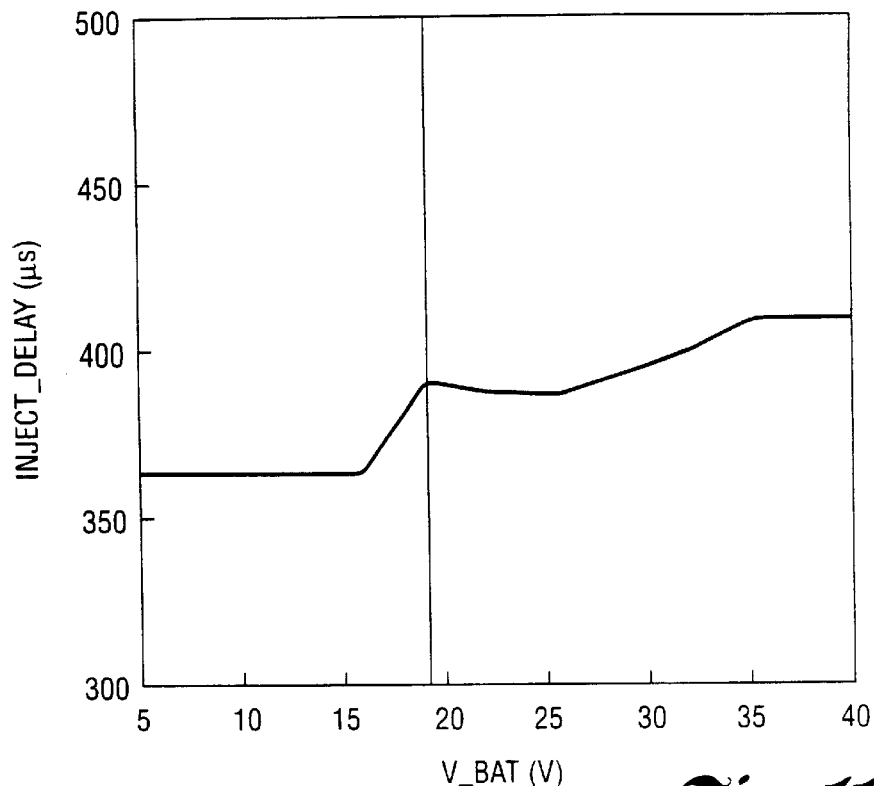
FIG. 11 is a graph depicting an injection delay factor versus available battery voltage which compensates for the influence of available battery voltage on control valve motion.

With reference to FIG. 3, additional aspects of the present invention will now be described. At decreased available battery voltages, the control valve takes longer to open as shown in dashed lines. Accordingly, the voltage is applied earlier at BOE_PILOT', causing earlier current ramp up resulting in earlier beginning of control valve motion. Although the voltage is applied at a time BOI_PILOT' such that the control valve will reach the full open position at the same time as when greater voltage is applied at BOI_PILOT, the earlier lifting of the control valve from its seat causes earlier needle lifting. As shown, the injection rate increases sooner after valve full open at decreased available battery voltages. To compensate for this, an injection delay INJECT_DELAY look-up table indexed by available battery voltage V_BAT is provided, as best shown in FIG. 11.

In one embodiment, INJECT_DELAY ranges from about 360 to about 410 microseconds and is indexed by battery voltages ranging from 0 to 51 volts.

Based on the determined value of INJECT_DELAY which is the delay between the control valve reaching the full open position and the start of fuel injection BOI_PILOT, a compensated BOE_PILOT will cause BOI_PILOT to occur when desired, compensating for travel time of the control valve. For example, as shown in FIG. 3, BOE_PILOT'' causes injection at the desired BOI_PILOT at the reduced available battery voltage shown in dashed lines.

Figure 12:
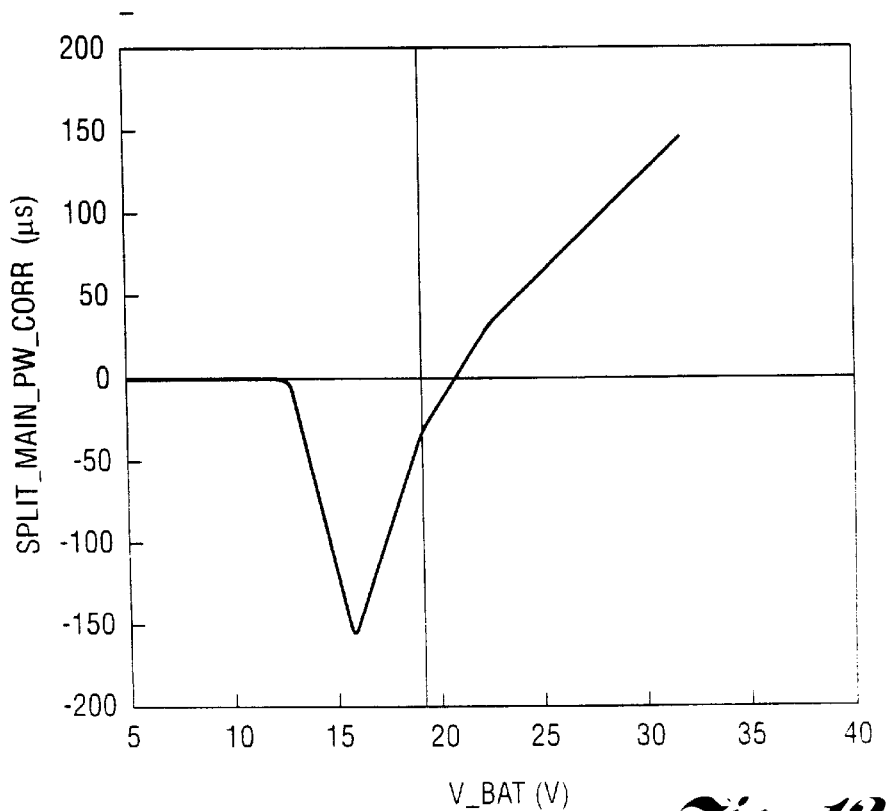
FIG. 12 is a graph depicting a split main pulse width adjustment factor versus available battery voltage which significantly reduces the influence of available battery voltage on split main pulse quantity injected.

An injection delay INJECT_DELAY also occurs at main injection as shown in FIG. 3. In a preferred embodiment, this injection delay is also compensated for at the main injection, and is additionally adjusted by adjusting the main pulse width MPW 68. An adjustment factor SPLIT_MAIN_PW_CORR is determined from a look-up table as best shown in FIG. 12, indexed by available battery voltage V_BAT. SPLIT_MAIN_PW_CORR is added to the raw main pulse width to produce an adjusted pulse width MPW 68. This adjustment is to compensate for the influence upon main pulse quantity of V_BAT, hence making possible a smooth transition between split and single injection without disturbing the engine torque governor, regardless of operating conditions.

In one embodiment, SPLIT_MAIN_PW_CORR ranges from about −160 to about 140 microseconds, and is located in a look-up table indexed by battery voltages ranging from about 6 to about 32 Volts.

It is to be appreciated that the present invention eliminates the problems associated with main injection valve opening detection, indicated at A (FIG. 3), in which the current inflection may be difficult to accurately detect and the rise-times may vary due to magnetism of the control valve from the pilot pulse. By establishing main rise-time, and by determining main injection initiation control times based on the established main rise-time IRT_MAIN, enhanced split injection is possible and practical at a wide range of engine speeds and loads and within a range of battery voltage. Increased valve opening detection noise which would otherwise cause unacceptable imprecision which grows more intolerable at high engine speeds is avoided by methods of the present invention which eliminate the need to detect main injection valve opening, and preferably utilize a filtered injection rise-time based on the pilot injection measured rise-times. Of course, it is appreciated that the present invention comprehends techniques for enabling and disabling split injection based on temperature, regardless of the split injection implementation.

With reference again to FIG. 3, in some diesel engine applications, it may be desirable to use split injection to enhance cold startability and idle stability at very cold ambient temperatures, while using a single injection at higher engine operating temperatures. As such, it is to be appreciated that embodiments of the present invention allow enabling and disabling of split injection as a function of engine operating temperatures.

Figure 13:
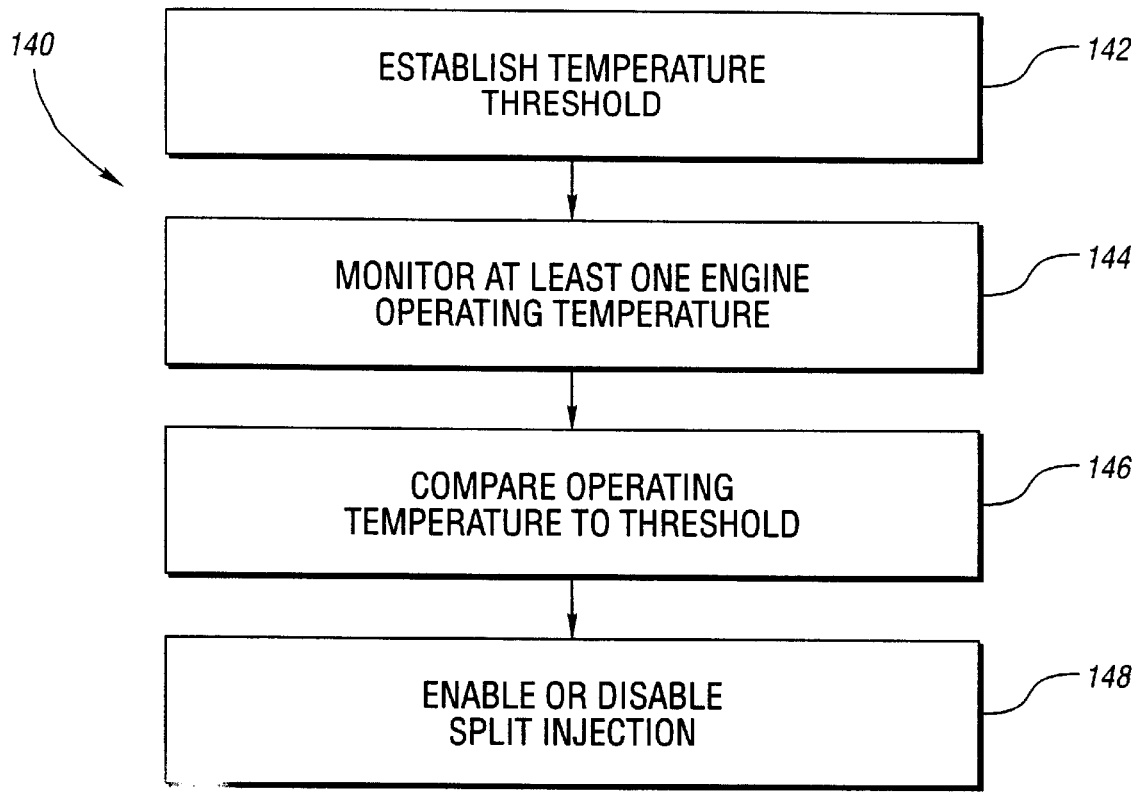
FIG. 13 is a block diagram illustrating a method of the present invention for enabling/disabling split injection based on an engine operating temperature.
Figure 14:
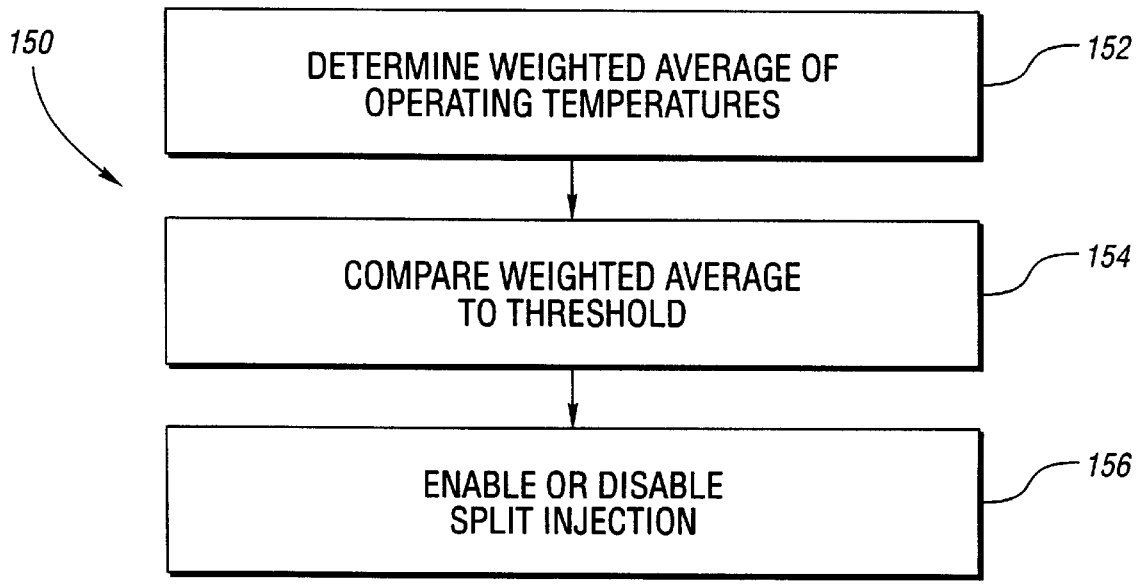
FIG. 14 is a block diagram illustrating a method of the present invention for enabling/disabling split injection based on a weighted temperature average.
Figure 15:
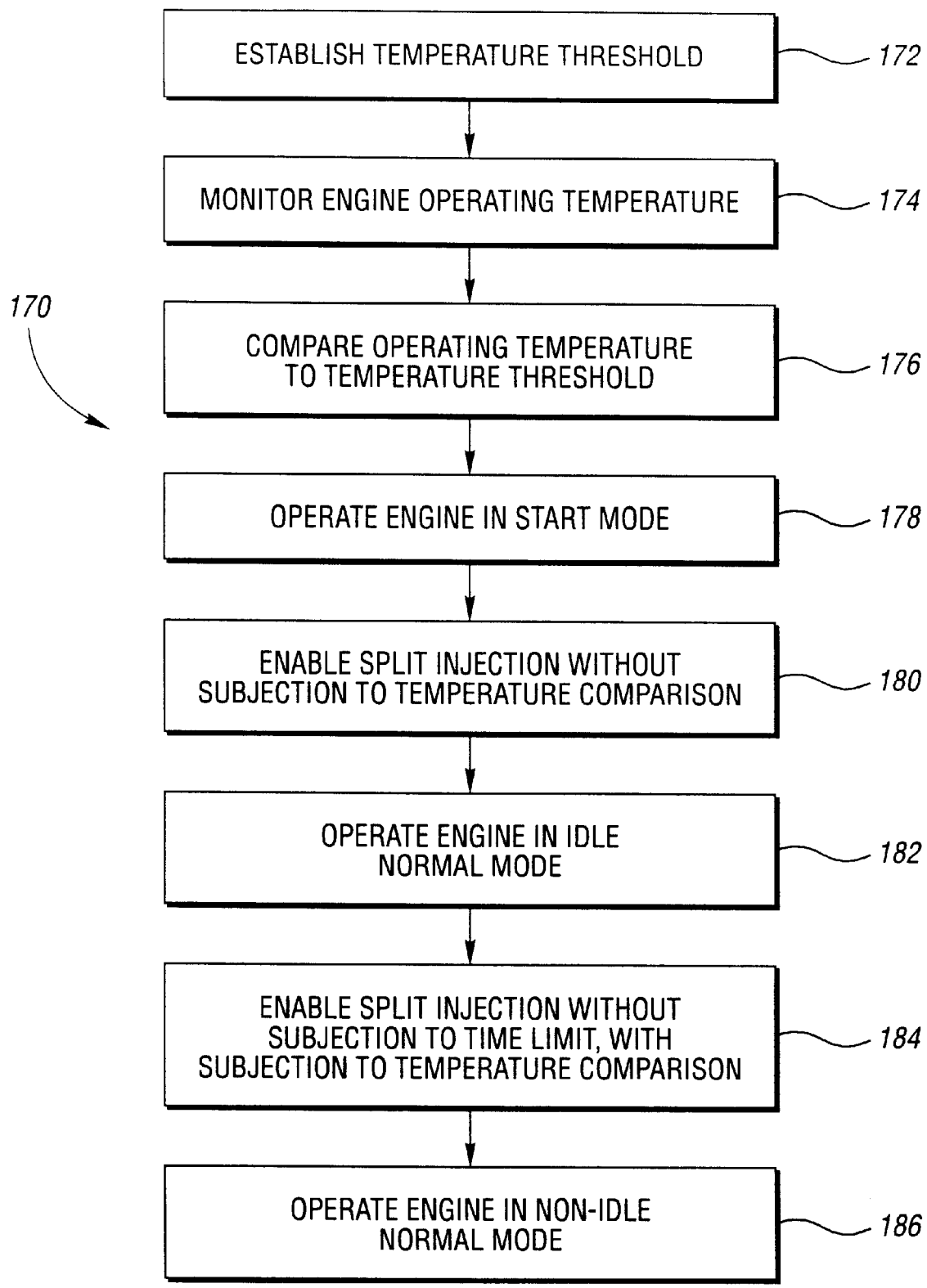
FIG. 15 is a block diagram illustrating a method of the present invention for enabling/disabling split injection based on temperature in the preferred embodiment.

In accordance with the present invention, there are several techniques for enabling or disabling split injection based on temperature. FIGS. 13–15 illustrate first, second and third exemplary methods.

With reference now to FIG. 13, a first method of the present invention for controlling fuel delivery as a function of engine temperature is generally indicated at 140. At block 142, a temperature threshold is established. At block 144, at least one engine operating temperature is monitored. Of course, any number of different engine operating temperatures may be monitored. Engine oil temperature, engine fuel temperature, and engine coolant temperature are examples of engine operating temperatures that may be monitored. In a first embodiment of the present invention wherein a single engine operating temperature is monitored, at block 146, the operating temperature is compared to the threshold. At block 148, split injection is enabled or disabled based on the result of the comparison at block 146.

More particularly, split injection is disabled when the engine operating temperature exceeds the temperature threshold. Disabling split injection in this manner enhances cold temperature engine operation, while utilizing single injection at higher temperatures. Further, split injection is enabled when the engine operating temperature falls below the temperature threshold. In a preferred embodiment, split injection is not enabled again after disablement until the engine operating temperature falls below the temperature threshold less a hysteresis value. The hysteresis is provided to prevent rapid toggling between single injection and split injection modes.

Further, it is to be appreciated that the language "operating temperature exceeds (or falls below) the temperature threshold" is meant to encompass other equivalent control implementations as would be appreciated by one of ordinary skill in the diesel fuel injection system art. For example, the comparison at block 146 may be of the "equal to" or the "greater (or less) than or equal to" type, both of which are considered equivalent, and both of which are meant to be encompassed by the language "operating temperature exceeds (or falls below) the temperature threshold."

With reference to FIG. 14, in a second embodiment of the present invention, a plurality of engine operating temperatures are monitored. As generally indicated at 150, a weighted average of the plurality of operating temperatures is determined (block 152), the weighted average is compared to the threshold (block 154), and split injection is enabled or disabled based upon the comparison (block 156) which preferably has some hysteresis.

Still further, in a preferred version of the embodiment in FIG. 14, each engine operating temperature is measured with a sensor having an output indicative of that engine operating temperature. A suitable sensor configuration may be configured such that upon failure of the sensor, the analog default sensor output is indicative of an engine operating temperature sufficiently high to disable split injection. When a weighted average of operating temperatures is compared to the threshold, a higher analog default sensor output value may be desired, depending on the weighting distribution, so that a particular failed sensor causes split injection to become disabled.

It is to be appreciated that in addition to the engine operating temperature, or weighted average of the plurality of engine operating temperatures, having to fall below the temperature threshold for split injection to be enabled, other criteria are preferably also required for split injection enablement, as described previously.

Further, it is to be appreciated that embodiments of the present invention utilizing multiple temperature thresholds are contemplated. For example, in an embodiment of the present invention in which a plurality of engine operating temperatures are monitored, each engine operating temperature may be compared to its own corresponding temperature threshold. Further, some of the engine operating temperatures may be processed to determine one or more weighted averages, while other engine operating temperatures are individually compared to corresponding temperature thresholds.

In an exemplary implementation, the engine has a plurality of sensors, and the instructions on the computer readable storage medium select two (or more if desired) temperature sensors. Further, the instructions specify the relative weights of each temperature to be used when determining the weighted temperature average. In the exemplary embodiment, the weighted temperature average is compared to a temperature threshold that has hysteresis. For backward compatibility, the temperature threshold may be selected sufficiently high such that engine operating temperature may never cause split injection to become disabled.

Of course, a weighted temperature average composed of two different engine operating temperatures is merely an exemplary implementation for the present invention, and other embodiments and variations, such as those described previously, are apparent to one of ordinary skill in the art of diesel fuel injection systems.

In the exemplary embodiment, the instructions on the computer readable storage medium are configured such that an analog default value for a sensor is used when a sensor happens to fail. The analog default values are usually high enough to disable split injection upon failure of either sensor. Further, the instructions are preferably implemented such that out of the many sensor outputs about the engine, the particular sensor outputs that are used in determining the weighted average are determined by the values in a pair of calibration variables. Each sensor on the engine has a corresponding calibration code value. The value contained in a calibration variable determines an engine operating temperature to be monitored. Of course, a pair of calibration variables are employed in the exemplary embodiment; but, more may be used to indicate additional temperatures to be monitored, as desired. As such, in the exemplary implementation, temperature based enabling/disabling of split injection may be disabled altogether by placing invalid values in the calibration variables that indicate the sensors to be used. Further, in an embodiment that selects two temperature sensors by setting the corresponding values for the two calibration variables, if desired, the instructions may be implemented such that an invalid value in exactly one of the two calibration variables and a valid value in the other calibration variable provides a single sensor embodiment. As such, the single valid sensor output is compared to the threshold.

Further, in the exemplary implementation, sometimes software default values may be desirable instead of analog default values for the sensors when a sensor has failed or is not configured. For example, engine oil temperature and engine fuel temperature, in the exemplary implementation, have software default values that are used instead of the analog default values in the event of sensor failure when either engine oil temperature or engine fuel temperature is selected for monitoring.

In FIG. 15, a third embodiment of controlling fuel delivery based on an engine operating temperature is illustrated in a block diagram generally indicated at 170. It is appreciated that some of the techniques for controlling the engine described in the previous figures may optionally be included in the embodiment shown in FIG. 15. Specifically, the embodiment of FIG. 15 may be implemented utilizing a single engine operating temperature, a plurality of engine operating temperatures, one or more weighted averages of engine operating temperatures, etc. At block 172, a temperature threshold is established. At block 174, an engine operating temperature is monitored. At block 176, the engine operating temperature is compared to the temperature threshold. Of course, at block 176, in the alternative, a plurality of comparisons may be made possibly including comparisons of one or more temperatures, one or more thresholds, and any number of weighted averages such as the weighted average technique of FIG. 14.

At block 178, the engine is operated in start mode. At block 180, split injection is enabled (in the start mode) without subjection to the temperature comparison. That is, split injection is always enabled at engine start up. At block 182, the engine is operated in the idle normal mode. At block 184, split injection is enabled (in idle normal mode) without subjection to a time limit and with subjection to the temperature comparison. That is, when split injection is enabled in the idle normal mode at block 184, it is not possible for split injection to time out, but rather split injection remains enabled until the disablement of split injection is dictated by the temperature comparison (or enhanced comparison involving a number of different temperatures or weighted averages, etc.) of block 176. At block 186, the engine is operated in the non-idle normal mode. When the engine is operated in the non-idle normal mode, some engines may always have split injection disabled. On the other hand, in some particular applications, it may be appropriate to utilize split injection in the non-idle normal operating mode with or without subjection to the temperature comparison of block 176.

It is to be appreciated that the temperature based control over the enablement or disablement of split injection provides enhanced cold engine startability and cold engine idle. Advantageously, split injection is always enabled in start mode without regard to the temperature comparison. Further, in the idle mode, or idle normal mode, split injection is enabled without any subjection to any time out, but with subjection to the temperature comparison.

Embodiments of the present invention have many advantages over previous attempts at utilizing split injection to enhance cold startability. For example, the present invention improves over split injection injection techniques that use split injection at start up and then use split injection for a short timed period at idle. In these systems, after the time limit is reached during idle, such as, for example, one second, the engine automatically disables split injection. In the present invention, advantageously, split injection remains enabled without subjection to any time limit until the temperature comparison dictates a disablement of split injection.

The embodiment of the present invention shown in FIG. 15 specifically addresses the problem of cold engine start up and idling under cold conditions in which the present invention recognizes that the time out values for split injection are inadequate. That is, at very cold temperatures, for example, below zero degrees Celsius, an engine may stall if split injection is not maintained at idle. Embodiments of the present invention keep split injection enabled without regard to any time limits and keep split injection enabled until dictated to disable split injection by the temperature comparison. That is, when the engine is warm enough, split injection could be disabled without the engine stalling.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of controlling fuel delivery in an internal combustion engine operable in a plurality of operating modes including a start mode and a normal mode, the normal mode including an idle normal mode and a non-idle normal mode, the engine having a split injection status and a fuel injection system configured to perform a split injection wherein a pilot injection event is separated from a main injection event by a delay when the split injection status is enabled, and configured to perform a single injection when the split injection status is disabled, the method comprising:

establishing a temperature threshold;
   monitoring an engine operating temperature;
   comparing the engine operating temperature to the temperature threshold;
   operating the engine in the start mode;
   enabling the split injection status without subjection to the temperature comparison while the engine operates in the start mode;
   after operating the engine in the start mode, operating the engine in the idle normal mode; and
   enabling the split injection status without subjection to a time limit while the engine operates in the idle normal mode and the engine operating temperature falls below the temperature threshold to enhance cold temperature engine operation, and otherwise disabling the split injection status while the engine operates in the idle normal mode.

2. The method of claim 1 further comprising:

operating the engine in the non-idle normal mode; and
   disabling the split injection status while the engine operates in the non-idle normal mode.

3. The method of claim 1 further comprising:

operating the engine in the non-idle normal mode; and
   enabling the split injection status without subjection to a time limit while the engine operates in the non-idle normal mode and the engine operating temperature falls below the temperature threshold to enhance cold temperature engine operation, and otherwise disabling the split injection status while the engine operates in the non-idle normal mode.

4. An engine controller including a computer readable storage medium having instruction thereon that are executable by the engine controller to perform a method of controlling fuel delivery in an internal combustion engine operable in a plurality of operating modes including a start mode and a normal mode, the normal mode including an idle normal mode and a non-idle normal mode, the engine having a split injection status and a fuel injection system configured to perform a split injection wherein a pilot injection event is separated from a main injection event by a delay when the split injection status is enabled, and configured to perform a single injection when the split injection status is disabled, the medium further comprising:

instructions for establishing a temperature threshold;
   instructions for monitoring an engine operating temperature;
   instructions for comparing the engine operating temperature to the temperature threshold;
   instructions for operating the engine in the start mode;
   instructions for enabling the split injection status without subjection to the temperature comparison while the engine operates in the start mode;
   instructions for after operating the engine in the start mode, operating the engine in the idle normal mode; and
   instructions for enabling the split injection status without subjection to a time limit while the engine operates in the idle normal mode and the engine operating temperature falls below the temperature threshold to enhance cold temperature engine operation, and otherwise disabling the split injection status while the engine operates in the idle normal mode.

5. The medium of claim 4 further comprising:

instructions for operating the engine in the non-idle normal mode; and
   instructions for disabling the split injection status while the engine operates in the non-idle normal mode.

6. The medium of claim 4 further comprising:

instructions for operating the engine in the non-idle normal mode; and instructions for enabling the split injection status without subjection to a time limit while the engine operates in the non-idle normal mode and the engine operating temperature falls below the temperature threshold to enhance cold temperature engine operation, and otherwise disabling the split injection status while the engine operates in the non-idle normal mode.

7. An internal combustion engine comprising an engine block with a plurality of cylinders, a plurality of fuel injectors disposed at the cylinders, and the engine controller including a computer readable storage medium having instruction thereon that are executable by an engine controller to perform a method of controlling fuel delivery in an internal combustion engine operable in a plurality of operating modes including a start mode and a normal mode, the normal mode including an idle normal mode and a non-idle normal mode, the engine having a split injection status and a fuel injection system configured to perform a split injection wherein a pilot injection event is separated from a main injection event by a delay when the split injection status is enabled, and configured to perform a single injection when the split injection status is disabled, the medium further having:

instructions for establishing a temperature threshold;

instructions for monitoring an engine operating temperature;

instructions for comparing the engine operating temperature to the temperature threshold;

instructions for operating the engine in the start mode;

instructions for enabling the split injection status without subjection to the temperature comparison while the engine operates in the start mode;

instructions for after operating the engine in the start mode, operating the engine in the idle normal mode; and instructions for enabling the split injection status without subjection to a time limit while the engine operates in the idle normal mode and the engine operating temperature falls below the temperature threshold to enhance cold temperature engine operation, and otherwise disabling the split injection status while the engine operates in the idle normal mode.

8. The engine of claim 7 wherein the medium further has:

instructions for operating the engine in the non-idle normal mode; and instructions for disabling the split injection status while the engine operates in the non-idle normal mode.

9. The engine of claim 7 wherein the medium further has:

instructions for operating the engine in the non-idle normal mode; and instructions for enabling the split injection status without subjection to a time limit while the engine operates in the non-idle normal mode and the engine operating temperature falls below the temperature threshold to enhance cold temperature engine operation, and otherwise disabling the split injection status while the engine operates in the non-idle normal mode.

* * * * *